United States Patent [19]

Bolla et al.

[11] Patent Number: 5,541,966
[45] Date of Patent: Jul. 30, 1996

[54] SYSTEM AND CIRCUIT FOR ESTIMATING THE CARRIER FREQUENCY OF A PSK NUMERIC SIGNAL

[75] Inventors: Maurizio Bolla, Milan; Massimo Gelichi, S. Piero A Grado; Franco Guglielmi, Milan; Nino Leuratti, Barlassina, all of Italy

[73] Assignee: Alcatel Italia S.p.A., Milan, Italy

[21] Appl. No.: 131,208

[22] Filed: Oct. 1, 1993

[30] Foreign Application Priority Data

Oct. 9, 1992 [IT] Italy .................... MI92A2325

[51] Int. Cl.⁶ .................................................. H04L 27/06
[52] U.S. Cl. .................... 375/329; 375/344; 455/257
[58] Field of Search ........................ 375/78, 83, 97, 375/99, 96, 10; 455/257, 263

[56] References Cited

U.S. PATENT DOCUMENTS

| | | | |
|---|---|---|---|
| 5,093,846 | 3/1992 | Walton, Jr. et al. | 375/97 |
| 5,128,968 | 7/1992 | Yoshida . | |
| 5,255,290 | 10/1993 | Anvari | 375/344 |
| 5,257,291 | 10/1993 | Desperben et al. | 375/97 |
| 5,299,231 | 3/1994 | Guglielmi et al. | 375/97 |

FOREIGN PATENT DOCUMENTS 0491403  6/1992  European Pat. Off. .
9120145  12/1991  WIPO .

OTHER PUBLICATIONS

EEE International Conference on Communications ICC '90, Apr. 15–19 1990, Atlanta, GA, vol. 4, pp. 1413–1417, "Carrier Phase Synchronisation for a Coded PSK Signal in Satellite Links" by S. W. Cheung.

International Conference on Mobile Radio Systems and Techniques, Sep. 10–13, 1984, University of York, UK "Digital Implementation of an Experimental Satellite Receiver" by M. P. Baker, et al, pp. 140–144.

*Primary Examiner*—Stephen Chin
*Assistant Examiner*—Timothy J. May
*Attorney, Agent, or Firm*—Ware, Fressola, Van Der Sluys & Adolphson

[57] ABSTRACT

The present invention concerns a system for estimating the carrier frequency of a PSK numeric signal, in which symbols are transmitted at frequency fs. The invention is characterized by the use of an estimate, at each symbol interval, of the angular difference between two successive data. Such estimate, suitably processed, provides the control signal for a circuit that compensates the frequency error between the carrier of the received signal and the local oscillator. In a not limiting embodiment, the invention can be implemented through digital circuitry.

22 Claims, 6 Drawing Sheets

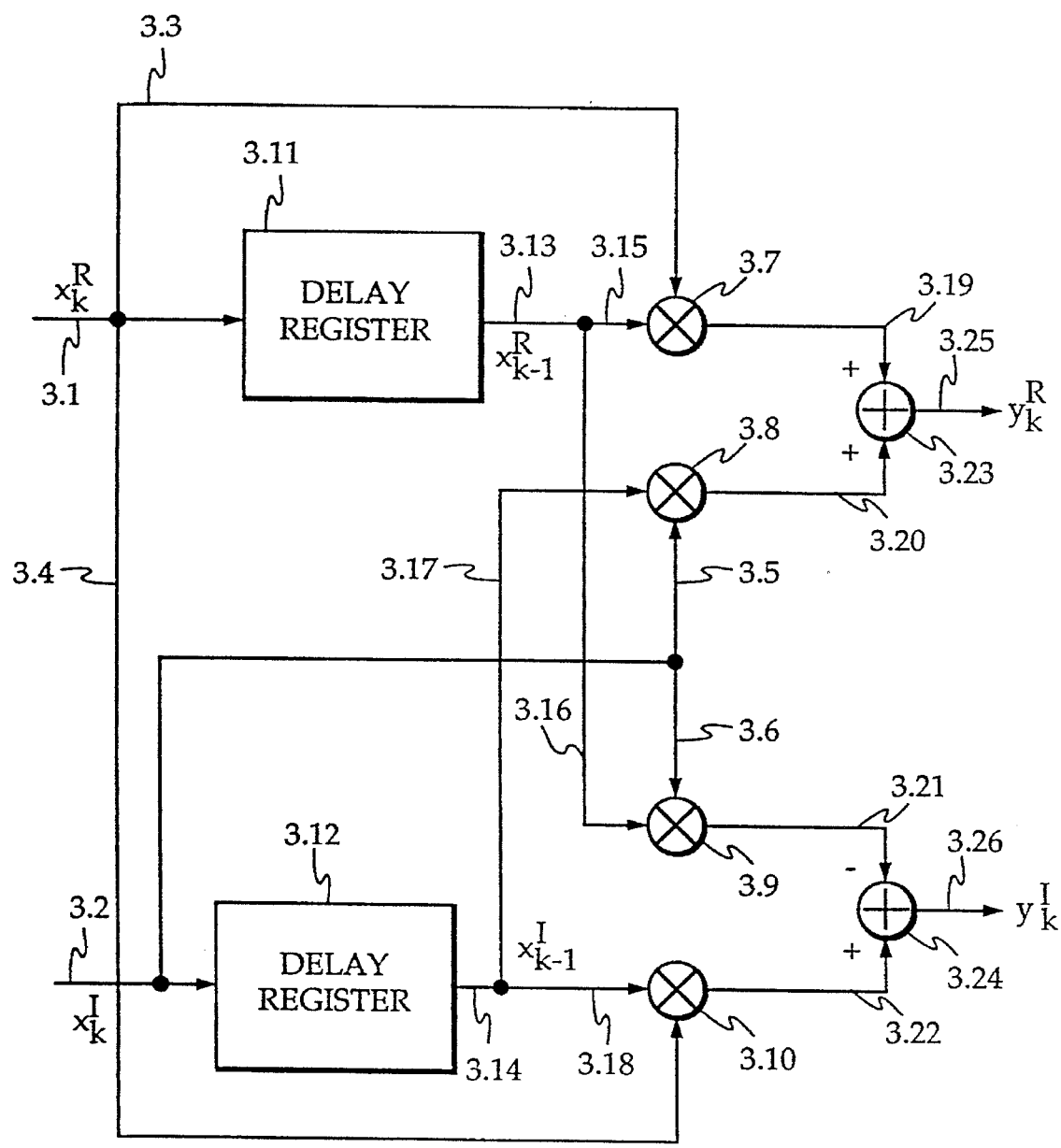
FIG. 3
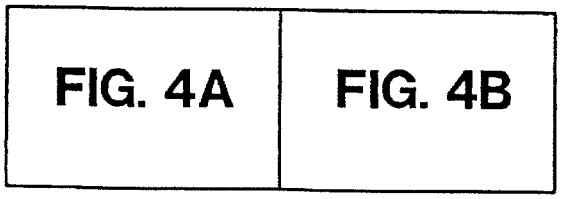

SYSTEM AND CIRCUIT FOR ESTIMATING THE CARRIER FREQUENCY OF A PSK NUMERIC SIGNAL

BACKGROUND OF THE INVENTION

FIELD OF THE INVENTION

The present invention relates to a system for estimating the carrier frequency of a phase shift keying (PSK) numeric signal, in which symbols are transmitted at frequency fs.

STATE OF THE ART

The RF transmission of the numeric signal makes use of a carrier provided by the transmit local oscillator. In reception another oscillator, nominally equal to the transmit one, operates the baseband conversion of the received signal.

In general the receive oscillator is not perfectly phase and frequency synchronized with the transmit one. Hence the problem arises with regard to providing suitable circuits which recover the carrier synchronism, identifying and correcting phase and frequency errors due to the non-ideal nature of the oscillators. Inside said circuits functional blocks may be distinguished that estimate phase and frequency errors (which the present invention is related to) and blocks which carry out compensations.

At present, in digital transmission systems, various carrier frequency estimators are used. Some of them are based upon an estimate of the spectrum centroid of the received signal carried out through power measurements. Such estimators work correctly if the power spectral density associated with signalling has even symmetry with respect to the carrier frequency. Therefore if the spectrum is non-symmetrical, its centroid does not coincide with the carrier frequency and the above-mentioned estimators make an incorrect estimate. In case of radio relay system transmission, unfavorable propagation phenomena, in particular the so-called selective fading, cause dissymmetries in the spectrum, these making conventional estimators unusable.

An alternative technique consists in generating an estimate of the carrier that varies periodically in the frequency interval to which the carrier frequency is supposed to belong.

When the estimated carrier takes on the signal carrier frequency, a suitable circuit detects the correctness of the estimate interrupting the periodic variation of the carrier itself. Such detector has some problems from the realization viewpoint and, moreover, in conventional systems, in order for it to have a satisfactory operation, it is necessary to keep low the rate in the estimate variation, thus slowing down the process of recognizing the signal carrier frequency.

Moreover, there exist rotational detectors that, unlike the devices described previously, use the estimates of transmitted data obtained separately by the decision device.

SUMMARY OF THE INVENTION

A first object of the invention is to provide a system for estimating the carrier frequency of a PSK numeric signal, in which an estimate of the product of two consecutive transmitted symbols is used, on the basis of the product of two suitable samples of the demodulated signal. The use of such a system produces an estimate of the relative phase more reliable than the one obtained by estimating data separately.

Another object of the invention is to provide a simple and effective circuitry for implementing said system.

These and other objects are achieved through systems and devices whose characteristic features are set forth in the attached claims.

According to the present invention, the carrier frequency of a PSK numeric signal is estimated by using a nonlinear operator to determine the relative phase between two consecutive symbols.

According further to the present invention, a frequency detector makes an estimate of the relative phase of two consecutive transmitted data by applying a suitable nonlinearity to the product of two signal samples.

The use of such an estimate, at each symbol interval, of the angular difference between two consecutive data, suitably processed, provides a control signal for a circuit which compensates the frequency error between the received signal carrier and the local oscillator. Such a process can be implemented through digital circuitry.

In order to illustrate the heart of such underlying basic idea, the ideal case in which the numeric signal with M-PSK modulation is received without any distortion and the presence of noise is negligible is discussed. The invention is nonetheless applicable in the nonideal case as well.

Let $a_k$ be the symbol transmitted at the generic instant $t_k=kT$ (where T is the symbol time of the signalling) and $x_k = x(kT)$ be the sample of the demodulated signal with frequency error $\Delta f$ and phase error $\psi$, the following expressions are obtained:

$$a_k = e^{j\theta_k} \qquad (1)$$

$$a_{k-1} = e^{j\theta_{k-1}} \qquad (2)$$

$$x_k = \alpha_k e^{j(2\pi\Delta f kT + \psi)} = e^{j(2\pi\Delta f kT + \psi + \theta_k)} \qquad (3)$$

$$x_{k-1} = \alpha_{k-1} e^{j[2\pi\Delta f(k-1)T + \psi]} = e^{j[2\pi\Delta f(k-1)T + \psi + \theta_{k-1}]} \qquad (4)$$

where $\theta_k$ and $\theta_{k-1}$ are random variables which can take on independently anyone of the values $2\pi/M$ where n=0, 1, ..., (M−1).

Combining suitably eq. (3) with eq. (4) it is obtained:

$$x_k x_{k-1}^* = e^{j(\theta_k - \theta_{k-1})} e^{j2\pi\Delta fT} \qquad (5a)$$

from which:

$$\Im m \{x_k x_{k-1}^*\} = \sin[\sin[2\pi\Delta fT + \theta_k - \theta_{k-1}]] \qquad (5)$$

Should the transmitted symbols be equal (i.e. $\theta_k = \theta_{k-1}$), it may be observed that the product of a signal sample with the conjugate of the preceding sample (or in particular its imaginary part) provides the measure of the frequency error $\Delta f$. Otherwise said product contains also the information on the phase difference between the transmitted symbols. In the rotational detector such information is eliminated by using estimates of the two transmitted data independently obtained in the decision process at the decision device. The solution-in accordance with the invention proposes a joint estimate of the two symbols, directed to obtain their phase difference.

The estimator is characterized by the nonlinear operator $Q_D(.)$ which is represented, in the complex plane, by the diagram of FIG. 1 in the special case of 8-PSK modulation: it provides, at the output, the value:

$$e^{j\frac{2\pi}{M}n}, \text{ where } n=0,1,\ldots,(M-1) \quad (6)$$

when phase α of the input suitably reduced module 2π) is comprised in the interval $$\frac{2\pi}{M}n - \frac{\pi}{M} \leq \alpha < \frac{2\pi}{M}n + \frac{\pi}{M} \quad (7)$$
where $n = 0, 1, \ldots, (M-1)$ If signal $x_k^* x_{k-1}$ is applied to the input of the estimator $Q_D$ (·), it outputs the estimate of the phase difference between the transmitted symbols $a_{k-1}$ and $a_k$, i.e.

$$Q_D(x_k^* x_{k-1}) = e^{-j(\theta_k - \theta_{k-1})} \quad (8)$$

provided that $\Delta f < \frac{1}{2}MT$

Combining expressions (5) and (8) it is obtained therefore:

$$\Im m\{x_k x_{k-1}^* Q_D(x_k^* x_{k-1})\} = \sin(2\pi \Delta fT) \quad (9)$$

which is proportional to Δf (and therefore its estimate) for values of Δf small enough. These and other objects, features and advantages of the present invention will become more apparent in light of the following detailed description of a best mode embodiment thereof, as illustrated in the accompanying drawing.

BRIEF DESCRIPTION OF THE DRAWING

FIG. 3 shows a schematic representation of an embodiment of subnetwork A of FIG. 2, according to the present invention.

DESCRIPTION OF THE PREFERRED EMBODIMENT

Figure 2:
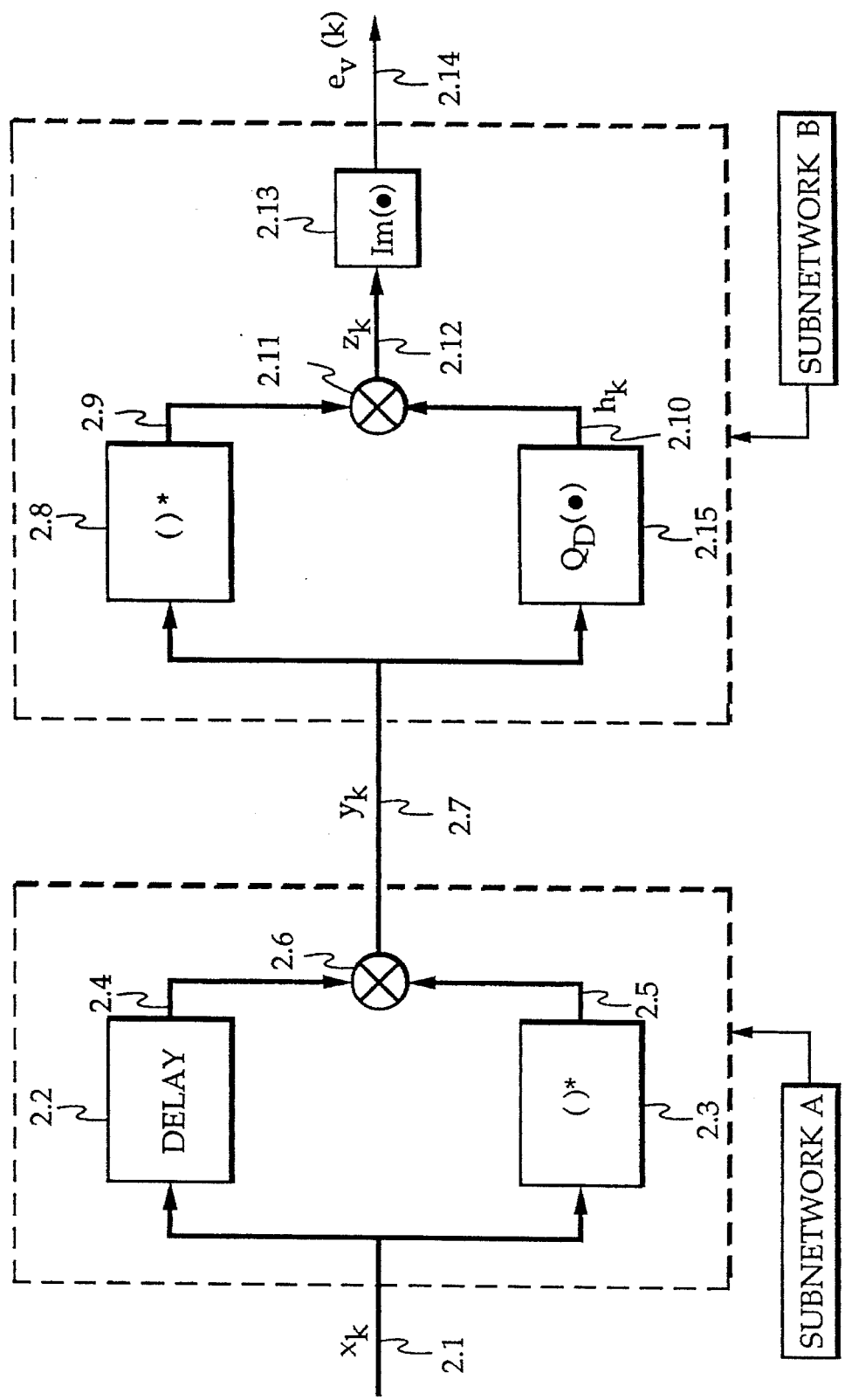
FIG. 2 is a functional block diagram, according to the present invention, of a method of frequency error estimation.
Figure 4A:
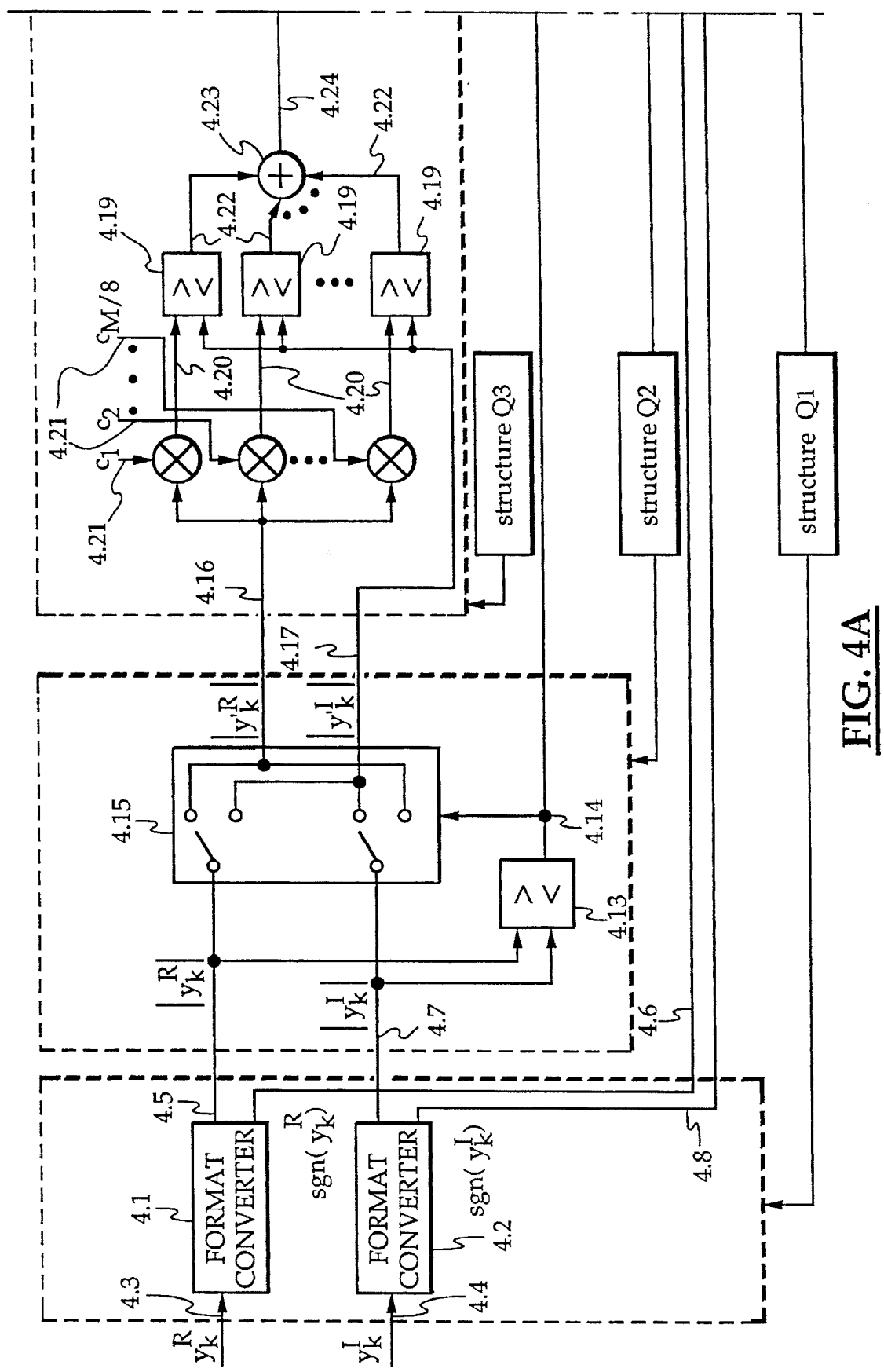
FIGS. 4A and 4B together are a schematic representation of a device for carrying out the nonlinearity operator QD such as shown by block 2.15 of FIG. 2, according to the present invention, valid for MP-SK modulations with M greater than or equal to 8.
Figure 4B:
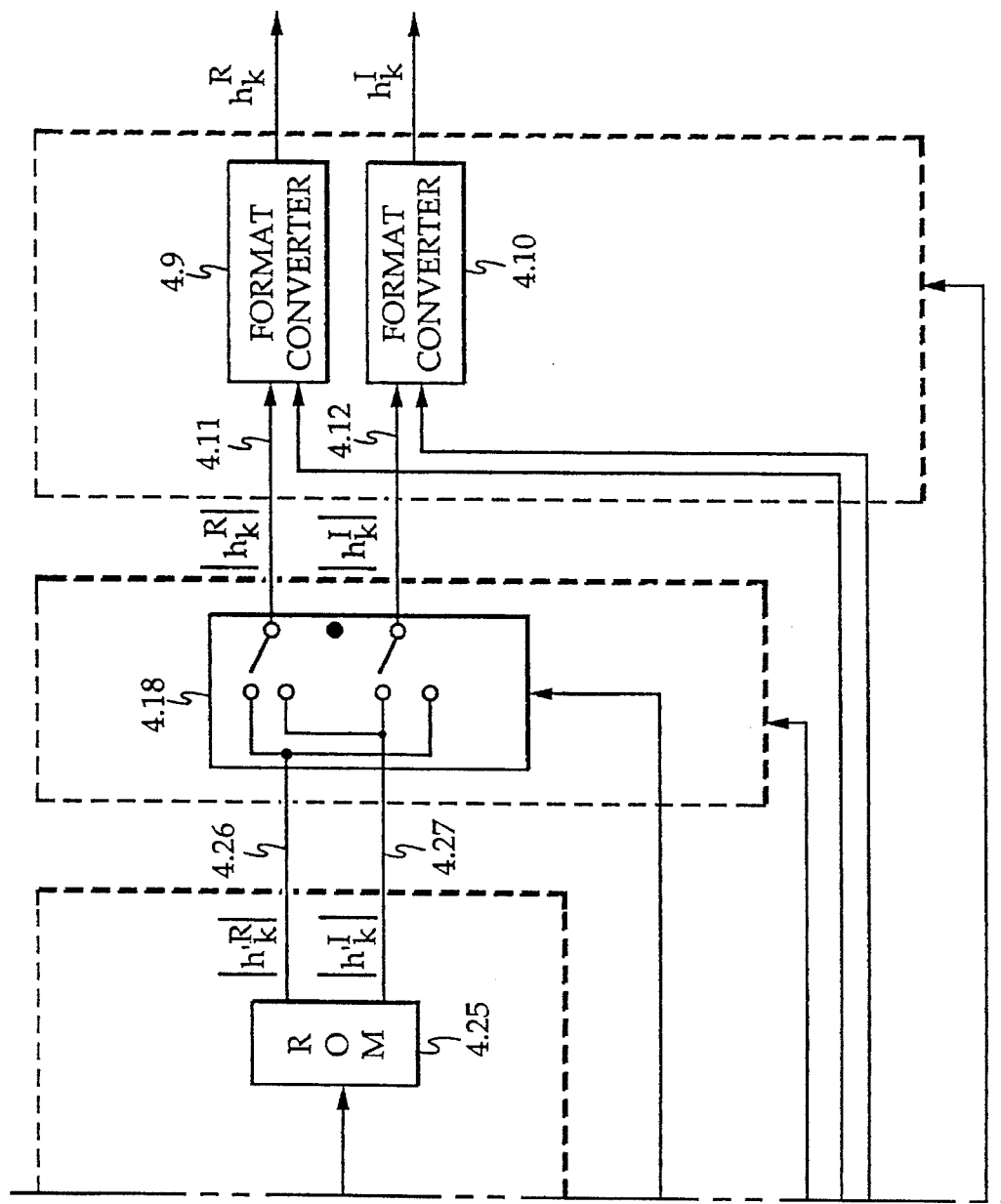

In FIG. 2 a functional block diagram is represented of the implementation of eq. (9) of the frequency error estimator. FIG. 4 shows the relation between FIGS. 4A and 4B. The complex signal $x_k$ (2.1), already demodulated with a free local oscillator, is fed to blocks (2.2) and (2.3) which respectively carry out the operation of delaying signal (2.1) by one symbol interval and the operation of transforming signal (2.1) into its complex conjugate.

Outputs (2.4) and (2.5) of such blocks are fed to multiplier (2.6) which outputs signal (2.7) expressable as:

$$y_k = x^*_k x_{k-1} \quad (10)$$

Signal (2.7) in turn is sent to block (2.8) that performs the transformation of signal (2.7) into its complex conjugate and, at the same time, to nonlinearity $Q_D$ (·) which performs the estimate described by equations (6) and (7). Signals (2.9) and (2.10) outgoing from block (2.8) and from nonlinearity (2.15), are multiplied each other by multiplier (2.11). The outcome of multiplication, $z_k$ (2.12), is fed to block (2.13) which extracts its imaginary part: the latter provides estimate $e_v(k)$ (2.14) of the frequency error Δf present on signal $x_k$.

According to one aspect of the invention it has been found that, to obtain particularly simple and effective implementations, it is advisable to subdivide the estimator just described into two subnetworks: a subnetwork A which processes the complex signal $x_k$ to obtain at every instant the product $y_k$ of a signal sample with the conjugate of next sample; a subnetwork B which processes the signal $y_k$ outgoing from subnetwork A to generate the estimate $e_v(k)$ of the frequency error.

Figure 5:
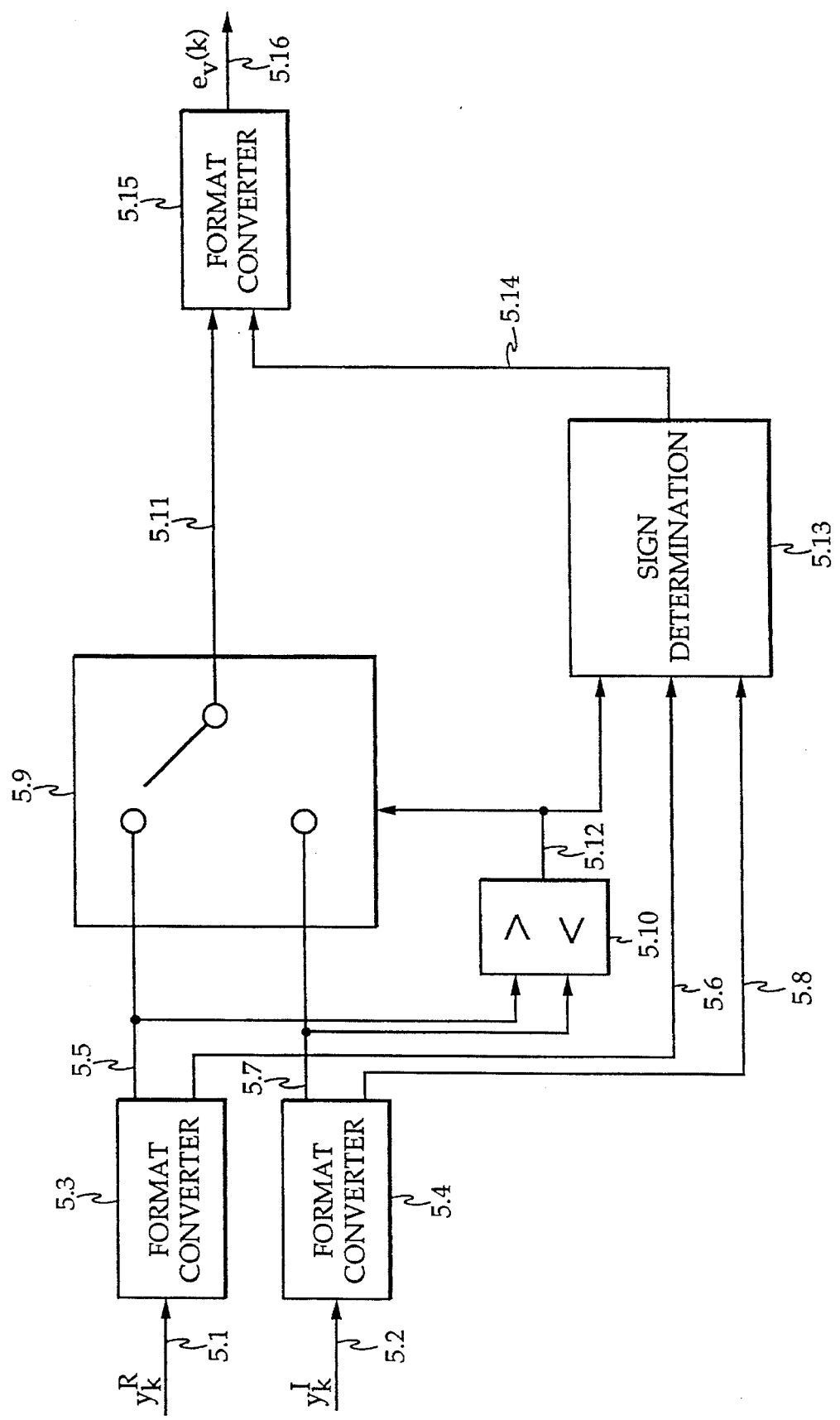
FIG. 5 shows a block diagram of a device for carrying out subnetwork B of FIG. 5, according to the present invention.

Subnetwork A allows a realization independent from the number of alphabet symbols of M-PSK modulation (FIG. 3); for subnetwork B, on the contrary, it is convenient to distinguish a generic realization for the M-PSK modulation with M≧8 (described in FIG. 2 and detailed, as to nonlinearity, in FIGS. 4A and 4B), and a special realization for the 4-PSK modulation (illustrated in FIG. 5).

* Subnetwork A

In FIG. 3 a schematic representation is shown of an embodiment of subnetwork A of FIG. 2. In such scheme signals are resolved into their real and imaginary components. The real part $x_k^R$ and the imaginary part $x_k^I$ of the signal $x_k$ (reference number 2-1 in FIG. 2) are respectively applied to inputs (3.1) and (3.2).

Connections (3.3), (3.4), (3.5), (3.6) carry the unaltered components of the signal to multipliers (3.7), (3.8), (3.9), (3.10). The two registers, (3.11) and (3.12), memorize and delay by one symbol interval the real part and the imaginary part of the sample of the received signal and therefore at the outputs (3.13) and (3.14), they have respectively the samples $x_{k-1}^R$ and $x_{k-1}^I$. Through connections (3.15), (3.16) and (3.17), (3.18), the outputs (3.13) and (3.14) of the two registers are respectively fed to multipliers (3.7), {3.9} and (3.8), (3.10}. Ultimately by summing suitably the outputs (3.19), (3.20), (3.21), (3.22) of multipliers in the adders (3.23) and (3.24), two signals, (3.25) and (3.26), are obtained at the output of the subnetwork which represent the real and imaginary components of the signal $Y_k$ described by equation (10) (ref. 2.7 in 2).

* Nonlinearity (M-PSK modulation with M≦8)

In FIGS. 4A and 4B a schematic representation is shown of an embodiment of nonlinearity (2.15) labelled $Q_D$ (.) in FIG. 2, valid for M-PSK modulations with M>8. Such circuit is constituted by three distinct functional structures (labelled 01, 02, 03 respectively) which allow the estimate of the angular difference between the transmitted symbols to be determined by exploiting the circular symmetry properties of the nonlinearity itself highlighted by FIG. 1.

The application of nonlinearity to signal $y_k$ is easier if $y_k$ is represented both in magnitude and sign. If not so, it is necessary to perform a format conversion at the input of the nonlinearity and the reverse conversion at the output (structure Q1).

The combined action of structures Q1 and Q2 generates signal $Y'_k$ coming into the structure Q3, mapping signal $Y_k$ in the first octant and performs the reverse mapping on signal $h'_k$ at the output of Q3 to obtain Structure Q3 performs comparison of signal $y'_k$ with the decision thresholds (confining itself to the first octant) and generates the estinate $h'_k$ (still belonging to the first octant).

* Structure Q1

Structure Q1 performs a format conversion on signal coming into and outgoing from nonlinearity; in fact, through blocks (4.1) and (4.2), input signals (4.3) and (4.4), which represent respectively the real and imaginary parts of signal $Y_k$, are converted into "magnitude and sign" representation format so that outputs (4.5), (4.6) and (4.7), (4.8) of blocks (4.1) and (4.2) represent magnitude and sign of $y_k^R$ and $y_k^I$, respectively.

In particular signals (4.5) and (4.7) represent respectively the real and imaginary parts of a signal reproduced in the first quadrant. Structure Q1 hence performs a mapping of sample $y_k$ into the first quadrant.

The reverse operation is carried out at the output where, through blocks (4.9) and (4.10), the signal is reconverted to the original representation format. The complex signal, having components (4.11) and (4.12), is taken again from the first quadrant to the quadrant which it pertains to.

* Structure Q2

Structure Q2 receives at the input signals $|y_k^R|$ and $|_k^I|$, which individuate a sample belonging to the first quadrant, and determines the mapping of the same into the first octant according to the rule:

$$|y_k^R| > |y_k^I| \Rightarrow \begin{cases} |y'^R_k| = |y_k^R| \\ |y'^I_k| = |y_k^I| \end{cases} \quad (11a)$$

$$|y_k^R| \leq |y_k^I| \Rightarrow \begin{cases} |y'^R_k| = |y_k^I| \\ |y'^I_k| = |y_k^R| \end{cases} \quad (11b)$$

To this end signals (4.5) and (4.7) are sent to block (4.13) which carries out the comparison and provides output (4.14) with one bit having value 1 or 0 depending on whether (11a) or (11b) is verified.

Output (4.14) drives switch (4.15) that connects inputs (4.5), (4.7) respectively to outputs (4.16), (4.17) or (4.17), (4.16) depending on the outcome of comparison carried out in block (4.13).

The reverse mapping is performed by switch (4.18) that, upon command from output (4.14), converts its input signal, belonging to the first octant, to a signal belonging to the first quadrant.

* Structure Q3

Structure Q3 performs the decision by comparing the position of sample $|y'k|$ with the decision thresholds contained in the first octant. The equations of the boundaries of such decision areas are given by:

$$|y'^I_k| = c_i |y'^R_k| \quad (12)$$

where $$c_i = tg\left[ (i-1)\frac{2\pi}{M} + \frac{\pi}{M} \right] \quad i = 1, \ldots, \frac{M}{8} \quad (13)$$

To this end M/8 comparisons of signal $y'^I_k$ with $c_i|y'^R_k|$ signals (4.20), obtained multiplying $|y'^R_k|$ signal (4.16) by $c_i$ coefficients (4.21), are performed through blocks (4.19). The outputs (4.22) of blocks (4.19) are then added in (4.23), the outcome (4.24) drives block (4.25) constituted by a read only memory (ROM) that provides, at outputs (4.26) and (4.27), two values among the following ones:

$$\begin{cases} |h'^R_k| = \cos\left( i\frac{2\pi}{M} \right) \\ |h'^I_k| = \sin\left( i\frac{2\pi}{M} \right) \end{cases} \quad i = 0, \ldots, \frac{M}{8} \quad (14)$$

* Subnetwork B (4-PSK modulation)

Figure 1:
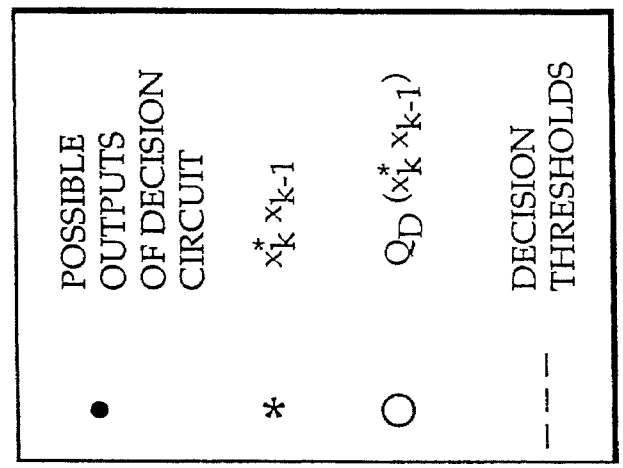
FIG. 1 shows an estimator, according to the present invention, characterized by the nonlinear operator $Q_D(.)$ which is represented, in the complex plane in the special case of 8-PSK modulation.
Figure 1:
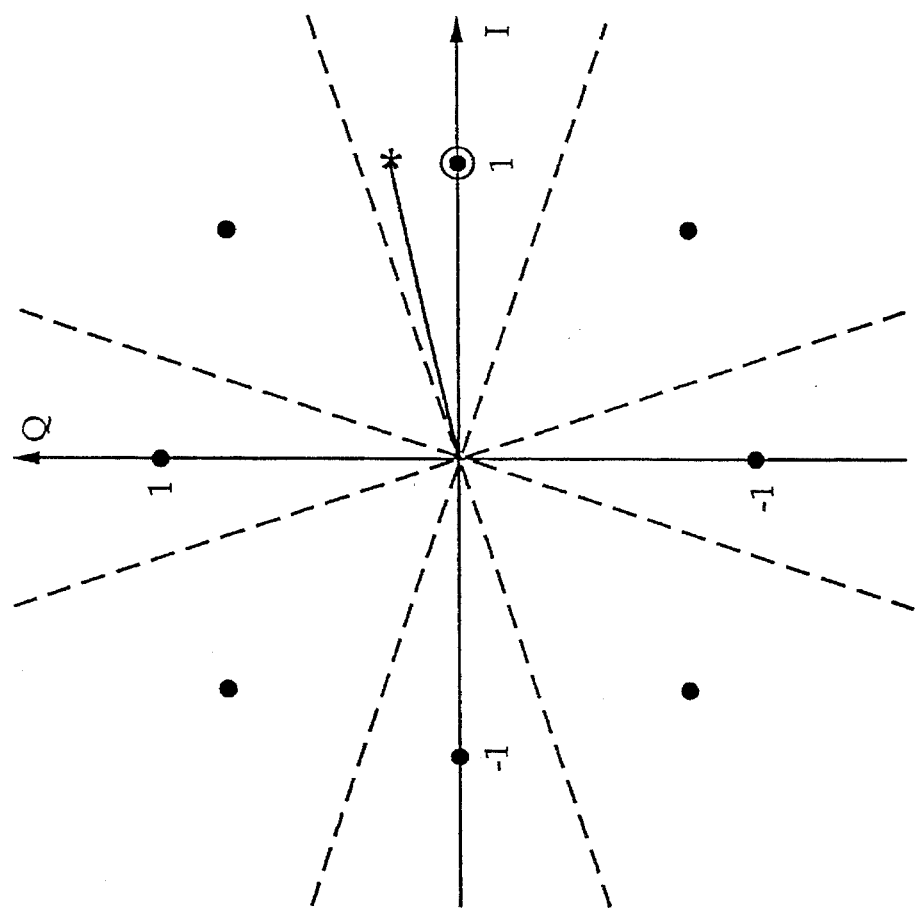

In case of 4-PSK modulation the boundaries of the decision areas of FIG. 1 coincide with the bisecting lines of the four quadrants; as a result, output $h_k$ of the nonlinearity $Q_D(\cdot)$ is related to input $y_k$ by the following relations:

$$|y_k^R| > |y_k^I| \Rightarrow \begin{cases} h_k^R = \text{sign}(y_k^R) \\ h_k^I = 0 \end{cases} \quad (15a)$$

$$|y_k^R| \leq |y_k^I| \Rightarrow \begin{cases} h_k^R = 0 \\ h_k^I = \text{sign}(y_k^I) \end{cases} \quad (15b)$$

From the general description of FIG. 2 and taking into account relations (15a) and (15b), the input-output link of subnetwork B is given by the following relation:

$$\begin{cases} |y_k^R| > |y_k^I| \Rightarrow e_v(k) = -y_k^I \cdot \text{sign}(y_k^R) \\ |y_k^R| \leq |y_k^I| \Rightarrow e_v(k) = y_k^R \cdot \text{sign}(y_k^I) \end{cases} \quad (16)$$

The relation (16) points out how in this case it is possible to obtain the estimate of the frequency error by operating directly on sample $y_k$ of the signal coming into the subnetwork.

FIG. 5 shows, in a not limiting form, an implementation of the subnetwork B. The real and imaginary parts (5.1) and (5.2) of signal $y_k$ (ref. 2.7 in FIG. 2) are converted into the magnitude and sign representation format through blocks (5.3) and (5.4). The outputs (5.5) and (5.7) of such blocks respectively represent values $|y_k^R|$ and $|y_k^I|$ which are sent to block (5.10) and to switch (5.9). Block (5.10) provides the output (5.12) with one bit of value "0" or "1" depending on whether the inequality $|y_k^R| > |y_k^I|$ verified or not. The bit (5 12) is sent to blocks (5.9) and (5.13). The switch (5.9) selects at the output the input (5.5) or (5.7) depending on the value of bit (5.12); the output (5.11) represents the magnitude of the frequency error estimate. Outputs (5.6) and (5.8) of blocks (5.3) and (5.4) represent the signs of $y_k^R$ and $y_k^I$ respectively; these are sent, along with output (5.12) of block (5.10), to block (5.13) that provides output (5.14) with the sign bit of the error estimate. Block (5.15) provides output (5.16) with error estimate $e_v(k)$, converted from magnitude and sign format into original format.

Even if the invention has been described with reference to embodiments illustrated in the figures for clearness' sake, it is obvious that the latter are susceptible to those variations and modifications that, being apparent to those skilled in the apt, ape to be considered as falling within the scope and the spirit of the invention.

We claim:

1. A system for estimating the carrier frequency of a phase shift keying (PSK) numeric signal in which symbols are transmitted at a transmit symbol frequency (fs), comprising:

means for sampling complex sample values of said numeric signal at a known signalling interval corresponding to said transmit frequency;

first processing means responsive to two consecutive complex sample values of said numeric signal for providing a complex product signal, said complex product signal being provided as the complex product of one of said two consecutive complex sample values with a complex conjugate of the other of said two consecutive complex sample values, said first processing means including:

delay means responsive to each of said complex sample values for providing a corresponding delayed complex sample value, said delayed complex sample value being indicative of a corresponding one of said complex sample values delayed by one of said known signalling intervals;

first complex conjugate means responsive to each of said complex sample values for providing a complex conjugate signal indicative of the complex conjugate of a corresponding one of said complex sample values; and first complex multiplier means responsive to said delayed complex sample value and said complex conjugate signal for providing said complex product signal; and second processing means responsive to said complex product signal, said second processing means applying a nonlinearity to said complex product signal for providing an error signal indicative of and estimate of the frequency error between the carrier frequency and said known signalling interval.

2. A system according to claim 1 wherein said second processing means comprises:

second complex conjugate means responsive to said complex product signal for providing a second complex conjugate signal indicative of the complex conjugate of said complex product signal;

nonlinearity means, having a nonlinear operator, responsive to said complex product signal for applying said nonlinearity to said complex product signal to provide a relative phase signal indicative of a phase difference between the transmitted symbols;

second complex multiplier means responsive to said second complex conjugate signal and said relative phase signals for providing a second complex product signal; and means responsive to said second complex product signal for extracting the imaginary part thereof, said imaginary part of said second complex product signal being provided as said error signal.

3. A system according to claim 2 wherein said nonlinearity means processes said complex product signal in the form of two parts including a corresponding real part and a corresponding imaginary part.

4. A system according to claim 3 wherein said nonlinearity means further comprises means for defining a set of decision thresholds, said nonlinearity means performing a comparison of said complex product signals with said decision thresholds for providing said relative phase signal.

5. A system according to claim 2 wherein said nonlinearity means further comprises means for defining a set of decision thresholds, said nonlinearity means performing a comparison of said complex product signals with said decision thresholds for providing said relative phase signal.

6. A system according to claim 1 wherein said second processing means comprises:

second complex conjugate means responsive to said complex product signal for providing a second complex conjugate signal indicative of the complex conjugate of said complex product signal;

nonlinearity means, having a nonlinear operator, responsive to said complex product signal for applying said nonlinearity to said complex product signal to provide a relative phase signal indicative of a phase difference between the transmitted symbols;

second complex multiplier means responsive to said second complex conjugate signal and said relative phase signals for providing a second complex product signal; and means responsive to said second complex product signal for extracting the imaginary part thereof, said imaginary part of said second complex product signal being provided as said error signal.

7. A system according to claim 6 wherein said nonlinearity means processes said complex product signal in the form of two parts including a corresponding real part and a corresponding imaginary part.

8. A system according to claim 6 wherein said nonlinearity means further comprises means for defining a set of decision thresholds, said nonlinearity means performing a comparison of said complex product signals with said decision thresholds for providing said relative phase signal.

9. A system for synchronizing a receive oscillator of an RF receiver with a transmit oscillator of an RF transmitter by estimating the carrier frequency of a phase shift keying (PSK) numeric signal received by the RF receiver, in which symbols are transmitted by the RF transmitter at a transmit frequency (fs), comprising:

means for sampling complex sample values of said numeric signal at a known signalling interval corresponding to said transmit frequency;

first processing means responsive to two consecutive complex sample values of said numeric signal for providing a complex product signal, said complex product signal being provided as the complex product of one of said two consecutive complex sample values with a complex conjugate of the other of said two consecutive complex sample values, said first processing means including;

delay means responsive to each of said complex sample values for providing a corresponding delayed complex sample value, said delayed complex sample value be indicative of a corresponding one of said complex sample values delayed by one of said known signalling intervals;

first complex conjugate means responsive to each of said complex sample values for providing a complex conjugate signal indicative of the complex conjugate of a corresponding one of said complex sample values; and first complex multiplier means responsive to said delayed complex sample value and said complex conjugate signal for providing said complex product signal; and second processing means responsive to said complex product signal, said second processing means applying a nonlinearity to said complex product signal for providing an error signal indicative of the difference in frequency between said known signalling interval and the carrier frequency;

wherein the receive oscillator is synchronized with the transmit oscillator by said error signal.

10. A system according to claim 9 wherein said second processing means comprises:

second complex conjugate means responsive to said complex product signal for providing a second complex conjugate signal indicative of the complex conjugate of said complex product signal;

nonlinearity means, having a nonlinear operator, responsive to said complex product signal for applying said nonlinearity to said complex product signal to provide a relative phase signal indicative of a phase difference between the transmitted symbols;

second complex multiplier means responsive to said second complex conjugate signal and said relative phase signals for providing a second complex product signal; and means responsive to said second complex product signal for extracting the imaginary part thereof, said imaginary part of said second complex product signal being provided as said phase error signal.

11. A system according to claim 10 wherein said nonlinearity means processes said complex product signal in the form of two parts including a corresponding real part and a corresponding imaginary part.

12. A system according to claim 11 wherein said nonlinearity means further comprises means for defining a set of decision thresholds, said nonlinearity means performing a comparison of said complex product signals with said decision thresholds for providing said relative phase signal.

13. A system according to claim 10 wherein said nonlinearity means further comprises means for defining a set of decision thresholds, said nonlinearity means performing a comparison of said complex product signals with said decision thresholds for providing said relative phase signal.

14. A system according to claim 9 wherein said second processing means comprises:

second complex conjugate means responsive to said complex product signal for providing a second complex conjugate signal indicative of the complex conjugate of said complex product signal;

nonlinearity means, having a nonlinear operator, responsive to said complex product signal for applying said nonlinearity to said complex product signal to provide a relative phase signal indicative of a phase difference between the transmitted symbols;

second complex multiplier means responsive to said second complex conjugate signal and said relative phase signals for providing a second complex product signal; and means responsive to said second complex product signal for extracting the imaginary part thereof, said imaginary part of said second complex product signal being provided as said phase error signal.

15. A system according to claim 14 wherein said nonlinearity means processes said complex product signal in the form of two parts including a corresponding real part and a corresponding imaginary part.

16. A system according to claim 15 wherein said nonlinearity means further comprises means for defining a set of decision thresholds, said nonlinearity means performing a comparison of said complex product signals with said decision thresholds for providing said relative phase signal.

17. A system according to claim 15 wherein said nonlinearity means further comprises means for defining a set of decision thresholds, said nonlinearity means performing a comparison of said complex product signals with said decision thresholds for providing said relative phase signal.

18. A system for synchronizing a receive oscillator of an RF receiver with a transmit oscillator of an RF transmitter by estimating the carrier frequency of a phase shift keying (PSK) numeric signal received by the RF receiver, in which symbols are transmitted by the RF transmitter at a transmit frequency (fs), comprising:

means for sampling complex sample values of said numeric signal at a known signalling interval corresponding to said transmit frequency;

first processing means responsive to two consecutive complex sample values of said numeric signal for providing a complex product signal, said complex product signal being provided as the complex product of one of said two consecutive complex sample values with a complex conjugate of the other of said two consecutive complex sample values; and second processing means responsive to said complex product signal, said second processing means applying a nonlinearity to said complex product signal for providing an error signal indicative of the difference in frequency between said known signalling interval and the carrier frequency, said second processing means including:

second complex conjugate means responsive to said complex product signal for providing a second complex conjugate signal indicative of the complex conjugate of said complex product signal;

nonlinearity means, having a nonlinear operator, responsive to said complex product signal for applying said nonlinearity to said complex product signal to provide a relative phase signal indicative of a phase difference between the transmitted symbols;

second complex multiplier means responsive to said second complex conjugate signal and said relative phase signals for providing a second complex product signal; and means responsive to said second complex product signal for extracting the imaginary part thereof, said imaginary part of said second complex product signal being provided as said phase error signal;

wherein the receive oscillator is synchronized with the transmit oscillator by said error signal.

19. A system according to claim 18 wherein said nonlinearity means processes said complex product signal in the form of two parts including a corresponding real part and a corresponding imaginary part.

20. A system according to claim 19 wherein said nonlinearity means further comprises means for defining a set of decision thresholds, said nonlinearity means performing a comparison of said complex product signals with said decision thresholds for providing said relative phase signal.

21. A system according to claim 18 wherein said nonlinearity means further comprises means for defining a set of decision thresholds, said nonlinearity means performing a comparison of said complex product signals with said decision thresholds for providing said relative phase signal.

22. A system according to claim 18 wherein said first processing means comprises:

delay means responsive to each of said complex sample values for providing a corresponding delayed complex sample value, said delayed complex sample value being indicative of a corresponding one of said complex sample values delayed by one of said known signalling intervals;

first complex conjugate means responsive to each of said complex sample values for providing a complex conjugate signal indicative of the complex conjugate of a corresponding one of said complex sample values; and first complex multiplier means responsive to said delayed complex sample value and said complex conjugate signal for providing said complex product signal.

* * * * *